United States Patent [19]

Murata et al.

[11] Patent Number: 5,292,811
[45] Date of Patent: Mar. 8, 1994

[54] PROCESS FOR PREPARING THERMOPLASTIC ELASTOMERS

[75] Inventors: Kazuhiko Murata; Shizuo Shimizu, both of Ichihara; Mamoru Kioka; Akinori Toyota, both of Kuga, all of Japan

[73] Assignee: Mitsui Petrochemical Industries, Ltd., Tokyo, Japan

[21] Appl. No.: 33,432

[22] Filed: Mar. 18, 1993

Related U.S. Application Data

[63] Continuation of Ser. No. 490,562, Jan. 30, 1991, abandoned.

[30] Foreign Application Priority Data

Nov. 21, 1989 [JP] Japan ................................. 63-294071

[51] Int. Cl.$^5$ ......................... C08L 23/26; C08L 53/00
[52] U.S. Cl. ................................. 525/193; 524/505; 524/528; 525/194; 525/240; 525/322; 525/323; 525/89
[58] Field of Search ............... 525/193, 194, 240, 322, 525/323, 89

[56] References Cited

U.S. PATENT DOCUMENTS

| | | | |
|---|---|---|---|
| 3,200,173 | 8/1965 | Schilling | 525/322 |
| 4,128,606 | 12/1978 | Furutachi et al. | 525/322 |
| 4,212,787 | 7/1980 | Matsuda et al. | 525/240 |
| 4,368,280 | 1/1983 | Yui et al. | 525/240 |
| 4,375,531 | 3/1983 | Ross | 525/93 |
| 4,491,652 | 1/1985 | Matthews et al. | 525/323 |
| 4,535,125 | 8/1985 | McCullough | 525/88 |
| 4,543,389 | 9/1985 | Barstain et al. | 525/323 |
| 4,547,552 | 10/1985 | Toyota et al. | 525/322 |
| 4,650,830 | 3/1987 | Yonekura et al. | 525/197 |
| 4,818,785 | 4/1989 | Otawa et al. | 525/194 |
| 4,829,125 | 5/1989 | Yeo et al. | 525/197 |
| 5,023,300 | 6/1991 | Huff et al. | 525/322 |
| 5,066,723 | 11/1991 | Randall et al. | 525/322 |

FOREIGN PATENT DOCUMENTS

0072203 2/1983 European Pat. Off. .
58-145741 8/1983 Japan .

OTHER PUBLICATIONS

Patent Abstracts of Japan, vol. 7, No. 273, Dec. 6, 1983.

*Primary Examiner*—Carman J. Seccuro, Jr.
*Attorney, Agent, or Firm*—Sherman and Shalloway

[57] ABSTRACT

Proposed herein is a process for preparing thermoplastic elastomers, which comprises dynamically heat treating polymer particles together with a crosslinking agent, each of the polymer particles being composed of a portion comprising a crystalline olefin polymer and portions comprising an amorphous olefin polymer, the polymer particles having an average particle diameter of at least 10 μm and an apparent bulk density of at least 0.2 g/ml.

13 Claims, No Drawings

PROCESS FOR PREPARING THERMOPLASTIC ELASTOMERS

This application is a continuation of application Ser. No. 07/490,562, filed Jan. 30, 1991, now abandoned.

FIELD OF THE INVENTION

The present invention relates to processes for preparing thermoplastic elastomers and more particularly to processes for preparing thermoplastic elastomers which are excellent in heat resistance, tensile strength, weatherability, flexibility, elasticity and impact strength at low temperatures and, at the same time, excellent in surface smoothness and coating properties.

BACKGROUND OF THE INVENTION

Heretofore, thermoplastic elastomers have been widely used as materials for the manufacture of automotive parts such as bumper. The thermoplastic elastomers have characteristics of both thermoplasticity and elasticity, and are capable of being formed by injection or extrusion molding into molded articles which are excellent in heat resistance, tensile properties, weatherability, flexibility and elasticity.

For example, Japanese Patent Publication No. 53-34210 discloses thermoplastic elastomers prepared by partially curing a blend of from 60 to 80 parts by weight of a monoolefin copolymer rubber and from 40 to 20 parts by weight of a polyolefin plastics under dynamical conditions. Japanese Patent Publication No. 53-21021 discloses thermoplastic elastomers comprising (a) a partially crosslinked copolymer rubber comprising a ethylene/propylene/non-conjugated polyene copolymer rubber having a gel content of from 30 to 90% by weight and (b) a polyolefin resin. Further, Japanese Patent Publication No. 55-18448 discloses thermoplastic elastomers prepared by partially or fully curing a blend of an ethylene/propylene copolymer rubber and a polyolefin resin under dynamical conditions.

Japanese Patent Laid-open Publication No. 58-187412 discloses a crosslinked block copolymer derived from an olefinic copolymer comprising from 50 to 70 parts by weight of one or more blocks [A] selected from homopolymer blocks of propylene and binary random copolymer blocks of propylene and ethylene of a C4-12 α-olefin and having a propylene content of from 100 to 60% by weight, and from 30 to 50 parts by weight of one or more blocks [B] selected from binary random copolymer blocks of ethylene and propylene and having an ethylene content of from 30 to 85% by weight, said crosslinked block copolymer having a specified content of hot xylene insoluble components and a specified fluidity.

Japanese Patent Laid-open Publications Nos. 63-165414, 63-165415 and 63-415416, and U.S. Pat. No. 4,454,306 disclose a process for preparation of a crosslinked olefinic block copolymer which comprises melt kneading an olefinic block copolymer comprising one or more homopolymer blocks of propylene [A], one or more first binary random copolymer blocks of propylene and ethylene [B]and one or more second binary random copolymer blocks of propylene and ethylene [C] and prepared using a specific Tiegler's catalyst, together with an organic peroxide, a divinyl compound and an antioxidant, at a temperature of not higher than 230° C.

Japanese Patent Laid-open Publication No. 48-21731 discloses a method for improving a processability of block copolymers wherein a block copolymer comprising from 3 to 30% by weight of copolymer segments primarily comprised of ethylene and containing up to 70% by weight of at least one other α-olefin and from 97 to 70% by weight of polymer segments primarily comprised of propylene is admixed with an organic peroxide and the admixture is heat treated at a temperature of from 180° to 270° C.

We have carried out extensive researches on the preparation of thermoplastic elastomers by direct dynamic heat treatment of polymer particles, and found that if polymer particles having a specific morphology are so treated, there can be economically prepared thermoplastic elastomers which are very smooth, excellent in strength and elasticity even though they have a reduced rubber content, and capable of being molded into articles having good appearance, in particular, good appearance after painted. The invention is based on the findings.

Thus, an object of the invention is to provide processes for the preparation of thermoplastic elastomers which have excellent elasticity even with a reduced rubber content and excellent strength, and are capable of being molded to articles which are very uniform, and excellent in strength properties such as tensile strength, heat resistance, weatherability, flexibility, elasticity, surface smoothness, properties of being painted and economy.

DESCRIPTION OF THE INVENTION

The first process for preparing partially or fully crosslinked thermoplastic elastomers according to the invention comprises dynamically heat treating polymer particles together with a crosslinking agent, each of said polymer particles being composed of a portion comprising a crystalline olefin polymer and portions comprising an amorphous olefin polymer, said polymer particles having an average particle diameter of at least 10 $\mu$m and an apparent bulk density of at least 0.2 g/ml.

The second process for preparing partially or fully crosslinked thermoplastic elastomers according to the invention comprises dynamically heat treating polymer particles together with a crosslinking agent and a crosslinking auxiliary, each of said polymer particles being composed of a portion comprising a crystalline olefin polymer and portions comprising an amorphous olefin polymer, said polymer particles having an average particle diameter of at least 10 $\mu$m and an apparent bulk density of at least 0.2 g/ml.

The third process for preparing partially or fully crosslinked thermoplastic elastomers according to the invention comprises dynamically heat treating polymer particles together with a crosslinking agent, a crosslinking auxiliary and a mineral oil softening agent, each of said polymer particles being composed of a portion comprising a crystalline olefin polymer and portions comprising an amorphous olefin polymer, said polymer particles having an average particle diameter of at least 10 $\mu$m and an apparent bulk density of at least 0.2 g/ml.

BEST MODES OF CARRYING OUT THE INVENTION

The processes for preparing thermoplastic elastomers according to the invention are illustrated below in detail.

In the processes according to the invention, polymer particles, each composed of a portion comprising a crystalline olefin polymer and portions comprising an amorphous olefin polymer, are used.

The polymer particles used herein have an average particle diameter of usually at least 10 μm, preferably from 10 to 5000 μm, more preferably from 100 to 4000 μm, and most preferably from 300 to 3000 μm. A geometrical standard deviation by which a particle size distribution of the polymer particles is designated is usually from 1.0 to 3.0, preferably from 1.0 to 2.0, more preferably from 1.0 to 1.5, and most preferably from 1.30 to 1.3. An apparent bulk density of the polymer particles used herein, as measured by spontaneous falling, is usually at least 0.2 g/ml, preferably from 0.2 to 0.7 g/ml, more preferably from 0.3 to 0.7 g/ml, and most preferably from 0.35 to 0.60 g/ml.

The polymer particles used herein contain particles passing through a sieve of 150 mesh in an amount of preferably not more than 30% by weight, more preferably not more than 10% by weight, and most preferably not more than 2% by weight. Furthermore, the polymer particles used herein exhibit a falling time of preferably from 5 to 25 seconds, more preferably from 5 to 25 seconds, and most preferably from 5 to 15 seconds, as measured by the falling test noted below.

The average particle diameter, apparent bulk density and falling time of the polymer particles are determined as follows.

Average Particle Diameter

At the top of a stainless sieve assembly supplied by Nippon Science Instrument Co. Ltd.(comprising 7 sieves having openings of 7, 10, 14, 20, 42, 80 and 150 mesh, respectively, stacked in this order from the top, and equipped with a receiving dish at the bottom) and having diameter of 200 mm and a depth of 45 mm, there was added 300 g of polymer particles. The sieve assembly was stoppered, set on a sieve shaker (supplied by IIDA Works Co. Ltd., and shaken for a period of 20 minutes. At the end of the period, polymer particles remaining on the respective sieves and received on the receiving dish were weighed respectively. The weight (% by weight) of the polymer particles was plotted against the opening (particle diameter in μm) on a logarithmico-normal probability paper. Based on the curve so obtained, a particle diameter at a point where an integrated weight is 50% by weight ($D_{50}$) was determined, and was taken as the average particle diameter.

Further, a particle diameter at a point where an integrated weight is 16% by weight ($D_{16}$) was determined, and the geometric standard deviation=$D_{50}/D_{16}$ was calculated.

Apparent Bulk Density

The apparent bulk density was determined in accordance with JIS K 6721-1977, using a funnel having an inlet inner diameter of 92.9 mm and an outlet inner diameter of 9.5 mm. and equipped with a damper at the outlet.

Falling Time

The apparatus used in the measurement of the apparent bulk density was used as such. Polymer particles were allowed to fall from the funnel in a 100 ml vessel, and excess polymer particles standing up above the vessel were swept with a glass rod thereby sampling 100 ml in bulk of the polymer particles. The 100 ml of the sample was transferred to the funnel having the damper inserted thereinto, and the damper was drawn to allow the particles fall. The falling time (in second) taken for all the sample to fall from the funnel was measured.

Incidentally, the measurement of the falling time was carried out on polymer particles from which large particles having a diameter 1.5 to 1.6 or more times the average particle diameter had been removed by sieving. Further, upon measurement of the falling time, the funnel was securely fixed to a vibrating plate of a powder tester (Type PT-D, Ser. No. 71190) supplied by Hosokawa Micro Co. Ltd., and the sample was allowed to fall under vibration. A voltage of an electric power for vibrating the plate was adjusted by means of a rheostat so that the amplitude of the vibration might be 1 mm.

Each of the polymer particles used herein is composed of a portion comprising a crystalline olefin polymer and portions comprising an amorphous olefin polymer, and has a so-called sea-and-islands structure in which the amorphous olefin portions constitute the islands. The islands, comprising the amorphous olefin polymer (and a part of the crystalline olefin polymer in some cases) desirably have an average particle diameter of not exceeding 0.5 μm, preferably not exceeding 0.1 μm, and more preferably not exceeding 0.05 μm.

The average particle diameter of the islands of the polymer particles used herein is determined as follows.

A polymer particle is sliced at a temperature of about −140° C., with an ultramicrotome to obtain a specimen having a thickness of from 500 to 1000 Å. The sliced specimen is then placed in a vapor phase of a sealed one liter vessel containing 200 ml of a 0.5% aqueous solution of $RuO_4$ for a period of 30 minutes, thereby dying the amorphous olefin polymer portions (islands) of the specimen, and the so dyed specimen is reinforced with carbon. At least 50 dyed islands of the specimen are measured for their particle diameters by observation with an electron transmission microscope, and the mean value of the so measured particle diameters is taken as the average particle diameter of the islands.

The polymer particles used herein are preferably those having such characteristics as mentioned above, and they are preferably prepared by the processes as will be mentioned hereinafter, though no particular limitation is placed on the processes for the preparation thereof. In the polymer particles thus obtained, the ash content thereof contains a transition metal component in an amount of usually not more than 100 ppm, preferably not more than 10 ppm, and more preferably not more than 5 ppm, and a halogen component in an amount of usually not more than 300 ppm, preferably not more than 100 ppm, and more preferably not more than 50 ppm.

The term polymer used herein is intended to include both polymer and copolymer.

The polymer particles having such characteristics as mentioned above may be obtained, for example, by polymerization or copolymerization of α-olefins having from 2 to 20 carbon atoms.

Examples of such α-olefins include, for example, ethylene, propylene, butene-1, 2-methylbutene-1, 3-methylbutene-1, hexene-1, 3-methylpentene-1, 4-methylpentene-1, 3,3-dimethylbutene-1, heptene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentene-1, decene-1, methylnonene-1, dimethyloctene-1, trimethylheptene-1, ethyloctene-1, methylethylbutene-1, diethylhexene-1, dodecene-1 and hexadodecene-1.

Of these α-olefins exemplified above, preferred are α-olefins having from 2 to 8 carbon atoms used either singly or in combination.

The polymer particles used herein contain recurring units derived from the above-mentioned α-olefin in an amount of usually at least 50 mol %, preferably at least 80 mol %, more preferably at least 90 mol %, and most preferably 100 mol %.

Other compounds usable together with the above-mentioned α-olefins in the preparation of the starting polymer particles used herein include, for example, chain polyene compounds and cyclic polyene compounds. The polyene compounds useful herein have at least two conjugated or nonconjugated olefinic double bonds, and include chain polyene compounds such as 1,4-hexadiene, 1,5-hexadiene, 1,7-octadiene, 1,9-decadiene, 2,4,6-octatriene, 1,3,7-octatriene, 1,5,9-decatriene and divinylbenzene, as well as cyclic polyene compounds such as 1,3-cyclopentadiene, 1,3-cyclohexadiene, 5-ethyl-1,3-cyclohexadiene, 1,3-cycloheptadiene, dicyclopentadiene, dicyclohexadiene, 5-ethylidene-2-norbonene, 5-methylene-2-norbornene, 5-vinyl-2-norbornene, 5-isopropylidene-2-norbornene, methylhydroindene, 2,3-diisopropylidene-5-norbornene, 2-ethylidene-3-isopropylidene-5norbornene and 2-propenyl-2,5-norbonadiene.

In the preparation of the starting polymer particles used herein, together with the above-mentioned α-olefins, there may also be used polyene compounds obtained by condensation of cyclopentadienes such as cyclopentadiene with α-olefins such as ethylene, propylene and butene-1 by utilizing Diels-Alder reaction.

Further, cyclomonoenes may also be used together with the above-mentioned α-olefins and optionally above-mentioned polyenes in the preparation of the starting polymer. Examples of such cyclomonoenes include, for example, mono-cycloalkenes such as cyclopropene, cyclobutene, cyclopentene, cyclohexene, 3-methylcyclohexene, cycloheptene, cyclooctene, cyclodecene, cyclododecene, tetracyclodecene, octacyclodecene and cycloeicosene; bicycloalkenes such as norbornene, 5-methyl-2-norbornene, 5-ethyl-2-norbornene, 5-isobutyl-2-norbornene, 5,6-dimethyl-2-norbornene, 5,5,6-trimethyl-2-norbornene and 2-bornene; tricycloalkenes such as 2,3,3a,7a-tetrahydro-4,7-methano-1H-indene and 3a,5,6,7a-tetrahydro-4,7-methano-1H-indene; and, in addition thereto, tetracycloalkenes such as 2-methyl-1,4,5,8-dimethano-1,2,3,4,4a,5,8,8a-octahydronaphthalene, 2-ethyl-1,4,5,8-dimethano-1,2,3,4,4a,5,8,8a-octahydronaphthalene, 2-propyl-1,4,5,8-dimethano-1,2,3,4,4a,5,8,8a-octahydronaphthalene, 2-hexyl-1,4,5,8-dimethano-1,2,3,4,4a,5,8,8a-octahydronaphthalene, 2-stearyl-1,4,5,8,8a-dimethano-1,2,3,4,4a,5,8,8a-octahydronaphthalene, 2,3-dimethyl-1,4,5,8-dimethano-1,2,3,4,4a,5,8,8a-octahydronaphthalene, 2-methyl-3-ethyl-1,4,5,8-dimethano-1,2,3,4,4a,5,8,8a-octahydronaphthalene, 2-chloro-1,4,5,8-dimethano-1,2,3,4,4a,5,8,8a-octahydronaphthalene, 2-bromo-1,4,5,8-dimethano-1,2,3,4,4a,5,8,8a-octahydronaphthalene, 2-fluoro-1,4,5,8-dimethano-1,2,3,4,4a,5,8,8a-octahydronaphthalene and 2,3-dichloro-1,4,5,8-dimethano-1,2,3,4,4a,5,8,8a-octahydronaphthalene; and polycycloalkenes such as hexacyclo[6,6,1,1,1$^{3,6}$,1$^{10,13}$,0$^{2,7}$,0$^{9,14}$]heptadecene-4, pentacyclo[8,8,12$^{,9}$,14$^{,7}$,1$^{11,18}$, 0,0$^{3,8}$,0$^{3,8}$, 0$^{12,17}$]heneicosene-5, and octacyclo[8,8,12$^{,9}$,14$^{,7}$,1$^{11,18}$,1$^{13,16}$,0,0$^{3,8}$,0$^{12,17}$]docosene-5.

Styrene and substituted styrenes may also be used as an optional monomer in the preparation of the starting polymer particles The polymer particles which can be used in the process according to the invention may be obtained by polymerization or copolymerization of at least the aforementioned α-olefin in the presence of a catalyst as noted below, and this polymerization or copolymerization reaction may be carried out either in a vapor phase (vapor phase process) or in a liquid phase (liquid phase process).

The polymerization or copolymerization according to the liquid process is carried out preferably in a suspension state so that the resulting polymer particles are obtained in a solid state. In this case, inert hydrocarbons can be used as the solvent. Alternatively, at least one α-olefins being polymerized may serve as the polymerization solvent.

The polymerization or copolymerization for the preparation of the polymer particles used herein is preferably carried out by a combined process comprising a first vapor phase process or a liquid phase process using an α-olefin as the solvent, followed by a second vapor phase process.

In preparing the polymer particles used in the process according to the invention, there may be employed a process which comprises forming simultaneously crystalline olefin polymer and amorphous olefin polymer by feeding at least two kinds of monomers to a polymerization vessel, or a process which comprises forming crystalline olefin polymer and amorphous olefin polymer separately but in series by using at least two polymerization vessels. Of the two processes, preferred is the latter one from a standpoint that the molecular weight, composition and amount of the resulting amorphous olefin polymer can be freely adjusted at will.

Of the latter process mentioned above, most preferred is a process which comprises forming a crystalline olefin polymer portion by a first vapor phase polymerization, followed by formation of amorphous olefin polymer portions by a second vapor phase polymerization, or a process which comprises forming a crystalline olefin polymer portion by using the monomer as a solvent, followed by formation of an amorphous olefin polymer portion by a vapor phase polymerization.

In the above-mentioned polymerization or copolymerization reaction, there is employed a catalyst normally composed of a catalyst component [A] containing at least one transition metal and a catalyst component [B] containing at least one organometallic compound of a metal selected from metals belonging to Groups I, II and III of the periodic table.

The above-mentioned catalyst components [A] used are preferably those containing transition metal atoms of Groups IVB and VB of the periodic table, and are further preferably those containing at least one atom selected from the group consisting of titanium, zirconium, hafnium and vanadium.

Besides the above-mentioned catalyst components [A], other useful catalyst components [A] are preferably those containing halogen and magnesium atoms in addition to the aforementioned transition metal atoms, and those containing compounds in which a group having conjugated π electrons has been coordinated to the transition metal of Group IVB or VB of the periodic table.

It is desirable that the catalyst components [A] used are prepared so that at the time of carrying out the abovementioned polymerization or copolymerization reaction, they may be present in a solid state in the reaction system or they are supported on solid carriers so as to be present in a solid state in the reaction system.

Solid catalyst components [A] containing halogen and magnesium atoms in addition to the transition metal atoms, will be further illustrated in detail.

The solid catalyst components [A] as mentioned above have an average particle diameter of preferably from 1 to 200 μm, more preferably from 5 to 100 μm, and most preferably from 10 to 80 μm. Such solid catalyst components [A] have a geometrical standard deviation ($\delta_g$), as a barometer of particle size distribution, of preferably from 1.0 to 3.0, more preferably from 1.0 to 2.1, and most preferably from 1.0 to 1.7.

An average particle diameter and particle size distribution of the catalyst components [A] may be determined by a light transmission method. Specifically, a dispersion is prepared by pouring a specimen of the catalyst component [A] into decalin so that the concentration (content) of said specimen becomes 0.1% by weight, the dispersion is put into a measuring cell, and the cell is exposed to a slit lighting, and changes of the intensity of the light passing through the liquid in a state where the particles are settling are continuously measured, whereby the particle size distribution of the specimen is measured. A standard deviation ($\delta_g$) is obtained from a logarithmic-normal distribution function as a ($\theta_{50}/\theta_{16}$) ratio of an average particle diameter ($\theta_{50}$) to a particle size diameter ($\theta_{16}$) of smaller particles amounting to 16% by weight. The average particle diameter as termed herein is a weight average particle diameter.

The catalyst components [A] are preferably spherical, ellipsoidal or granular in shape, and an aspect ratio of the particle thereof is preferably not more than 3, more preferably not more than 2 and most preferably not more than 1.5. The aspect ratio can be determined by optical microscopic observation of particles of the catalyst component [A], measurement of major and minor axes on 50 particles and calculation.

When the catalyst components [A] contain magnesium, titanium and halogen atoms and an electron donor, magnesium/titanium (atomic ratio) is preferably greater than 1, and this value is usually from 2 to 50, preferably from 6 to 30, halogen/titanium (atomic ratio) is usually from 4 to 100, preferably from 6 to 40, and electron donor/titanium (molar ratio) is usually from 0.1 to 10, preferably from 0.2 to 6. The specific surface area of the catalyst components [A] is usually at least 3 m²/g, preferably at least 40 m²/g and more preferably from 100 to 800 m²/g.

Generally, the catalyst components [A] will not release the titanium compound contained therein by such a mild operation as rinsing with hexane at room temperature.

In addition to the above-mentioned components, the catalyst components [A] used herein may contain other atoms and metals, and may be incorporated with appropriate functional groups. Further, the catalyst components [A] may be diluted with organic or inorganic diluents.

The catalyst components [A] as illustrated above may be prepared, for example, by a process in which the magnesium compound having the average particle diameter, particle size distribution and shape as defined above is prepared, followed by catalyst preparation, or by a process in which a liquid magnesium compound and a liquid titanium compound are brought into contact with each other and thereby to form a solid catalyst having such properties of their particles as defined above.

The catalyst components [A] thus prepared may be used, as they are, or there may also be used those prepared by supporting the magnesium and titanium compounds, if necessary, the electron donor, on carriers uniform in shape, or those prepared by granulating a particulate catalyst prepared in advance into such a desirable shape as mentioned above.

Such catalyst components [A] as illustrated above are disclosed in Japanese Patent Lsid-open Publications. Nos. 55-135102, 55-135103, 56-811 and 56-67311, and specifications attached to Japanese Patent Applications. Nos. 56-181019 and 61-21109.

For reference, some processes for the preparation of the catalyst components [A] disclosed in the above-cited patent publications or specification are as in the following.

(1) A solid magnesium compound/electron donor complex having an average particle diameter of from 1 to 200 μm and a geometrical standard deviation ($\delta_g$) of particle size distribution of not more than 3.0 is pretreated, or not pretreated, with an electron donor and/or a reaction assistant such as organoaluminum compound or a halogen-containing silicon compound, and the complex is caused to react under reaction conditions with a liquid halogenated titanium compound, preferably titanium tetrachloride.

(2) A liquid magnesium compound having no reducing ability is caused to react with a liquid titanium compound, preferably in the presence of an electron donor, to deposit a solid component having an average particle diameter of from 1 to 200 μm and a geometrical standard deviation ($\delta_g$) of particle size distribution of not more than 3.0. If desired, the solid component thus obtained is caused to react with a liquid titanium compound, preferably titanium tetrachloride, or with a liquid titanium compound and an electron donor.

(3) A liquid magnesium compound having a reducing ability is preliminarily brought into contact with a reaction assistant, such as polysiloxane or halogen-containing silicon compound, capable of disappearance of the reducing ability of the magnesium compound to deposite a solid component having an average particle diameter of from 1 to 200 μm and a geometrical standard deviation ($\delta_g$) of particle size distribution of not more than 3.0, followed by causing the solid component to react with a liquid titanium compound, preferably titanium tetrachloride, or with a titanium compound and an electron donor.

(4) A magnesium compound having a reducing ability is brought into contact with an inorganic carrier such as silica or with an organic carrier, the carrier is then brought into contact, or not in contact, with a halogen-containing compound, and brought into contact with a liquid titanium compound, preferably titanium tetrachloride, or with a titanium compound and an electron donor, thereby causing the magnesium compound supported on the carrier reset to with the titanium compound.

(5) The first half of the process (2) above or the first half of the process (3) above, is carried out in the presence of an inorganic carrier such as silica or alumina on an organic carrier such as polyethylene, polypropylene or polystyrene, thereby preparing the Mg compound supported by the carrier, followed by the second half of the process (2) or (3) above.

The solid catalyst components [A] thus prepared have such a performance that they are capable of preparing polymers having high stereo-regularity at high catalytic efficiency. For example, when homopolymerization of propylene is carried out under the same conditions by using the solid catalyst component [A], it is found that this catalyst component has an ability to give polypropylene having an isotacticity index (insoluble in boiling n-heptane) of at least 92%, preferably at least 96% in an amount, based on 1 mmole of titanium, of usually at least 3000 g, preferably at least 5000 g and more preferably at least 10000 g.

Examples of the magnesium compound, halogen-containing silicon compound, titanium compound and electron donor which can be used at the time of preparing the above-mentioned catalyst components [A] are shown hereinafter. The aluminum components which can be used in the preparation of the catalyst comonents [A] includes compounds illustrated hereinafter on the organometallic compound catalyst components [B].

Examples of the magnesium compound include inorganic magnesium compounds such as magnesium oxide, magnesium hydroxide, and hydrotalcite, and organic magnesium compounds such as magnesium carboxylates, alkoxymagnesium compounds, aryloxymagnesium compounds, alkoxymagnesium halides, aryloxymagnesium halides, magnesium dihalides, dialkylmagnesium compounds, Grignard reagents and diarylmagnesium compounds.

Examples of the titanium compound include titanium halides such as titanium tetrachloride and titanium trichloride, alkoxytitanium halides, aryloxytitanium halides, alkoxytitanium compounds and aryloxytitanium compounds. Of these, preferred are titanium tetrahalides, in particular, titanium tetrachloride.

Examples of the electron donor include oxygen-containing electron donors such as alcohols, phenols, ketones, aldehydes, carboxylic acids, esters of organic or inorganic acid, ethers, acid amides, acid anhydrides and alkoxysilane; and nitrogen-containing electron donors such as ammonia, amines, nitriles and isocyanates.

More specifically, examples of the compounds useful as the electron donor include:

alcohols having from 1 to 18 carbon atoms such as methanol, ethanol, propanol, pentanol, hexanol, octanol, dodecanol, octadecyl alcohol, oleyl alcohol, benzyl alcohol, phenylethyl alcohol, isopropyl alcohol, cumyl alcohol and isopropylbenzyl alcohol;

phenols having from 6 to 20 carbon atoms which may have lower alkyl groups such as phenol, cresol, xylenol, ethylphenol, propylphenol, nonylphenol, cumylphenol and naphthol;

ketones having from 3 to 15 carbon atoms such as acetone, methyl ethyl ketone, methyl isobutyl ketone, acetophenone, benzophenone and benzoquinones;

aldehydes having from 2 to 15 carbon atoms such as acetaldehyde, propionaldehyde, octylaldehyde, benzaldehyde, tolualdehydes and naphthoaldehydes;

organic acid esters having from 2 to 30 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluylate, ethyl toluylate, amyl toluylate, ethyl ethylbenzoate, methyl anisylate, n-butyl maleate, diisobutyl methylmaronate, di-n-hexyl cyclohexenecarboxylate, diethyl nadylate, diisopropyl tertahydrophthalate, diethyl phthalate, diisobutyl phthalate, di-n-butyl phthalte, di-2-ethylhexyl phthalate, γ-butyrolactone, δ-valerolactone, coumarin, phthalide and ethylene carbonate;

halides having from 2 to 15 carbon atoms such as acetyl chloride, benzoyl chloride, toluic acid chlorides and anisic acid chlorides;

ethers of having from 2 to 20 carbon atoms such as methyl ether, ethyl ether, isopropyl ether, butyl ether, amyl ether, tetrahydrofuran, anisole and diphenyl ether; and in particular diethers;

acid amides such as acetamide, benzamide and toluamide;

amines such as methylamine, ethylamine, diethylamine, tributylamine, piperidine, tribenzylamine, aniline, pyridine, picoline and tetramethylenediamine;

organic phosphorous compounds having P—O—C bond such as trimethyl phosphite and triethyl phosphite; and alkoxysilanes such as ethyl silicate and diphenyl dimethoxysilane. These electron donors may be used either singly or in combination.

Of the electron donors as exemplified above, preferred are compounds having no active hydrogen, for example, esters of organic or inorganic acid, alkoxy (or aryloxy)silane compounds, ethers, ketones, tertiary amines, acid halides and acid anhydrides, and organic acid esters and alkoxy (or aryloxy) silane compounds are particularly preferred. Above all, particularly preferred are esters of an aromatic monocarboxylic acid with an alcohol having from 1 to 8 carbon atoms; esters of a dicarboxylic acid such as malonic acid, substituted malonic acids, substituted succinic acids, maleic acid, substituted maleic acids, 1,2-cyclohexanedicarboxylic acid and phthalic acids with an alcohol having at least 2 carbon atoms; and diethers. Needless to say, it is not always necessary that these electron donors are added as starting materials to the reaction system at the time of preparing the catalyst components [A]. For instance, it is also possible that compounds convertible into these electron donors are first added to the reaction system and then converted into said electron donors in the course of preparation of the catalyst components [A].

The catalyst components [A] as obtained in the manner mentioned above may be purified by thoroughly rinsing with liquid inert hydrocarbon compounds. Examples of the hydrocarbons usable in the above case include:

aliphatic hydrocarbon compounds such as n-pentane, isopentane, n-hexane, isohexane, n-heptane, n-octane, isooctane, n-decane, n-dodecane, kerosine and liquid paraffin;

alicyclic hydrocarbon compounds such as cyclopentane, methyl cyclopentane, cyclohexane and methyl cyclohexane;

aromatic hydrocarbon compounds such as benzene, toluene, xylene and thymene; and halogenated hydrocarbon compounds such as chlorobenzene and dichloroethane.

These inert hydrocarbon compounds may be used either singly or in combination.

The organometallic compound catalyst components [B] used in the present invention are preferably organoaluminum compounds having in the molecule at least one Al-carbon bond.

Examples of the organoaluminum compounds mentioned above include:

(i) those represented by the formula:

$$R^1{}_m Al(OR^2)_n H_p X_q \quad (i)$$

wherein $R^1$ and $R^2$, which may be the same or different, and each represents a hydrocarbon group having usually from 1 to 15 carbon atoms, preferably from 1 to 4 carbon atoms, X is a halogen atom, m is $0 \leq m \leq 3$, n is $0 \leq n < 3$, p is $0 \leq p < 3$, q is $0 \leq q < 3$, and $m+n+p+q=3$; and (ii) complex alkylated compounds of a metal of Group I of the periodic table with aluminum represented by the formula $$M^1 Al R^1{}_4 \quad (ii)$$

wherein $M^1$ is Li, Na or K, and $R^1$ is as defined above.

The organoaluminum compounds of the formula (i) include concretely such compounds as will be mentioned hereinbelow.

Compounds represented by the formula:

$$R^1{}_m Al(OR^2)_{3-m}$$

wherein $R^1$ and $R^2$ are as defined above, and m is preferably $1.5 \leq \leq m < 3$.

Compounds represented by the formula:

$$R^1{}_m Al X_{3-m}$$

wherein $R^1$ is as defined above, X is a halogen atom, and m is preferably $0 < m < 3$.

Compounds represented by the formula:

$$R^1{}_m Al H_{3-m}$$

wherein $R^1$ is as defined above and m is preferably $2 \leq m < 3$.

Compounds represented by the formula:

$$R^1{}_m Al(OR^2)_n X_q$$

wherein $R^1$ and $R^2$ are as defined above, X is a halogen atom, m is $0 < m \leq 3$, n is $0 \leq n < 3$, q is $0 \leq q < 3$, and $m+n+q=3$.

Concrete examples of the organoaluminum compounds represented by the above-mentioned formula (i) include:

trialkylaluminum compounds such as triethylaluminum, tributylaluminum and triisopropylaluminum;

trialkenylaluminum compounds such as triisoprenylaluminum;

partially alkoxylated alkylaluminum compounds, including, for example, dialkylaluminum alkoxides such as diethylaluminum ethoxide and dibutylaluminum butoxide; alkylaluminum sesquialkoxides such as ethylaluminum sesquiethoxide and butylaluminum sesquibutoxide; and other partially alkoxylated alkylaluminum compounds having an average composition, for example, represented by the formula $R^1{}_{2.5} Al(OR^2)_{0.5}$ wherein $R^1$ and $R^2$ are as defined above;

partially halogenated alkylaluminum compounds, including, for example, dialkylaluminum halides such as diethylaluminum chloride, dibutylaluminum chloride and diethylaluminum bromide; alkylaluminum sesquihalides such as ethylaluminum sesquichloride, butylaluminum sesquichloride and ethylaluminum sesquibromide; alkylaluminum dihalides such as ethylaluminum dichloride, propylaluminum dichloride and butylaluminum dichloride;

partially hydrogenated alkylaluminum compounds, including, for example, alkylaluminum hydrides such as diethylaluminum hydride and dibutylaluminum hydride, alkylaluminum dihydrides such as ethylaluminum dihydride and propylaluminum dihydride; and partially alkoxylated and halogenated alkylaluminum compounds such as ethylaluminum ethoxychloride, butylaluminum butoxychloride and ethylaluminum ethoxybromide.

The organoaluminum compounds may be, for example, those having at least two aluminum atoms linked together through oxygen or nitrogen atom, which are analogous to the compounds represented by the aforementioned formula (i). Concrete examples of such organoaluminum compounds as mentioned above include $(C_2H_5)_2AlOAl(C_2H_5)_2$, $(C_4H_9)_2AlOAl(C_4H_9)_2$ and $(C_2H_5)_2AlN(C_6H_5)Al(C_2H_5)_2$.

Examples of the organoaluminum compounds of the aforementioned formula (ii) include, for example, $LiAl(C_2H_5)_4$ and $LiAl(C_7H_{15})_4$.

Of the organoaluminum compounds illustrated above, it is particularly desirable to use a trialkylaluminum, a mixture of a trialkylaluminum and an alkylaluminum halide, and a mixture of a trialkylaluminum and an aluminum halide as the catalyst component [B].

The polymerization or copolymerization for the preparation of the polymer particles used herein, is carried out in the presence of the catalyst component [A] and organometallic compound catalyst component [B]. In this case, an electron donor [C] is preferably used in combination with the components [A] and [B].

Examples of the electron donor [C] usable herein include amines, amides, ethers, ketones, nitriles, phosphines, stibines, arsines, phosphoamides, esters, thioethers, thioesters, acid anhydrides, acid halides, aldehydes, alcoholates, alkoxy(or aryloxy)silanes, organic acids and amides of metals belonging to Groups I, II, III and IV of the periodic table and salts thereof. The above-mentioned salts may also be formed in the reaction system by a reaction of organic acids with the organometallic compounds used as the catalyst components [B].

Concrete examples of the above-mentioned electron donors may be the compounds exemplified in the case of the catalysts components [A]. Of these electron donors, particularly preferred are organic acid esters, alkoxy(aryloxy)silane compounds, ethers, ketones, acid anhydrides and amides. In particular, when the electon donor in the catalyst component [A] is a monocarboxylic acid ester, the electron donors [C] are preferably an alkyl ester of an aromatic carboxylic acid.

When the electron donor in the catalyst component [A] is an ester of a dicarboxylic acid with an alcohol having at least two carbon atoms, the electron donors [C] used herein are preferably alkoxy(aryloxy)silane compounds represented by the formula $R_n Si(OR^1)_{4-n}$ wherein R and $R^1$ each represent a hydrocarbon group and n is $0 \leq n < 4$, and amines large in steric hindrance.

Concrete examples of the alkoxy(aryloxy)silane compounds mentioned above include trimethylmethoxysilane, trimethoxyethoxysilane, dimethyldimethoxysilane, dimethylethoxysilane, diisopropyldimethoxysilane, t-butylmethyldimethoxysilane, t-amylmethyldiethoxysilane, diphenyldimethoxysilane, phenylmethyldimethoxysilane, diphenyldiethoxysilane, bis-o-tolyldimethylsilane, bis-m-tolyldimethoxysilane, bis-p-tolylmethoxysilane, bis-p-tolyldiethoxysilane, bisethylphenyldimethoxysilane, dicyclohexyldimethoxysilane, cyclohexylmethylmethoxysilane, ethyltrimethoxysilane, ethyltriethoxysilane, vinyltrimethoxysilane, n-propyltriethoxysilane, decylmethoxysilane, decyltriethoxysilane, phenyltrimethoxysilane, γ-chloropropyltrimethoxysilane, methyltrimethoxysilane, vinyltriethoxysilane, t-butyltriethoxysilane, n-butyltriethoxysilane, iso-butyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbonanetrimethoxysilane, 2-norbornanedimethyldimethoxysilane, ethyl silicate, butyl silicate, trimethylphenoxysilane, methyltriallyloxysilane, vinyltris(β-methoxysilane) and dimethyltetraethoxydisiloxane. Of there, preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolylmethoxysilane, p-tolylmethyldimethoxysilane, dicyclohexyldimethoxysilane, dichlorohexylmethyldimethoxysilane, 2-norbornanetriethoxysilane, 2-norbornanemethyldimethoxysilane, diphenyldiethoxysilane and ethyl silicate.

Particularly suitable as the aforementioned amines large in steric hindrance are 2,2,6,6-tetramethylpiperidine, 2,2,5,5-tetramethylpyrrolidine and derivatives of these compounds, and tetramethylmethylenediamine. Of these compounds mentioned above, particularly preferable electron donors used as catalyst component are alkoxy(aryloxy)silane compounds and diethers.

In the polymerization or copolymerzation for preparing the starting polymer particles used herein, there may be preferably used catalysts composed of a catalyst component [i] containing a compound of a transition metal atom of Groups IVB and VB of the periodic table which has a group containing conjugated π electrons as a ligand, and an organometallic compound catalyst component [ii].

The transition metals belonging to Groups IVB and VB of the periodic table include metals of zirconium, titanium, hafnium chromiun and vanadium.

Examples of the group as the ligand having conjugated π electrons include, for example, cyclopentadienyl, alkyl-substituted cyclopentadienyl groups such as mthylcyclopentadienyl, ethylcyclopentadienyl, t-butylcyclopentadienyl, dimethylcyclopentadienyl and pentamethylcyclopentadienyl, and indenyl and fluorenyl.

Also suitable as the above-mentioned group are those containing at least two such ligands having a cycloalkadienyl skeleton linked together through a lower alkylene group or a group containing silicon, phosphorus, oxygen or nitrogen. Such groups as mentioned above include ethylenebisindenyl and isopropyl(cyclopentadienyl-1-fluorenyl).

At least one, preferably two ligands having the cycloalkadienyl skeleton are coordinated to the transition metal.

Ligands other than those having the cycloalkadienyl skeleton may be hydrocarbon groups having from 1 to 12 carbon atoms, alkoxy groups, aryloxy groups, halogen or hydrogen.

The hydrocarbon groups having from 1 to 12 carbon atoms may be alkyl, cycloalkyl, aryl and aralkyl, and concretely the alkyl group includes methyl, ethyl, propyl, isopropyl and butyl, the cycloalkyl group includes cyclopentyl and cyclohexyl, the aryl group includes phenyl and tolyl, the aralkyl group includes benzyl and neophyl. The alkoxy group includes methoxy, ethoxy and butoxy, the aryloxy group includes phenoxy, and the halogen includes fluorine, chlorine, bromine and iodine.

The transition metal compounds containing at least one ligand having a cycloalkadienyl skeleton may be represented, when the valency of the transition metal contained is four, by the formula:

$$R^2{}_k R^3{}_l R^4{}_m R^5{}_n M$$

wherein M is zirconium, titanium, hafnium or vanadium, $R^2$ is a group having a cycloalkadienyl skeleton, $R^3$, $R^4$ and $R^5$, each is a group having a cycloakadienyl skeleton, an alkyl, cycloalkyl, aryl, aralkyl alkoxy or aryloxy group, or a halogen or hydrogen atom, k is an integer of at least 1, and $k+l+m+n=4$.

Particularly preferable compounds of the above-mentioned formula are those in which $R^2$ and $R^3$ are the groups having a cycloalkadienyl skeleton, said two groups being linked to each other through a lower alkylene group or a group containing silicon, phosphoryl, oxygen or nitrogen.

Concrete examples of the transition metal compounds containing ligands having a cycloalkadidenyl skeleton represented by the above-mentioned formula in which M is zirconium are exemplified below.
Bis(cyclopentadienyl)zirconium monochloride monohydride,
bis(cyclopentadienyl)zirconium monobromide monohydride,
bis(cyclopentadienyl)methyl zirconium hydride,
bis(cyclopentadienyl)ethyl zirconium hydride,
bis(cyclopentadienyl)phenyl zirconium hydride,
bis(cyclopentadienyl)benzyl zirconium hydride,
bis(cyclopentadienyl)neopentyl zirconium hydride,
bis(methylcyclopentadienyl)zirconium monochloride hydride,
bis(indenyl)zirconium monochloride monohydride,
bis(cyclopentadienyl)zirconium dichloride,
bis(cyclopentadienyl)zirconium dibromide,
bis(cyclopentadienyl)methyl zirconium monochloride,
bis(cyclopentadienyl)ethyl zirconium monochloride,
bis(cyclopentadienyl)cyclohexyl zirconium monochloride,
bis(cyclopentadienyl)phenyl zirconium monochloride,
bis(cyclopentadienyl)benzyl zirconium monochloride,
bis(methylcyclopentadienyl)zirconium dichloride,
bis(t-butylcyclopentadienyl)zirconium dichloride,
bis(indenyl)zirconium dichloride,
bis(indenyl)zirconium dibromide,
bis(cyclopentadienyl)zirconium dimethyl,
bis(cyclopentadienyl)zirconium diphenyl,
bis(cyclopentadienyl)zirconium dibenzyl,
bis(cyclopentadienyl)zirconium methoxychloride,
bis(cyclopentadienyl)zirconium ethoxychloride,
bis(methylcyclopentadienyl)zirconium ethoxychloride,
bis(cyclopentadienyl)zirconium phenoxychloride
bis(fluorenyl)zirconium dichloride,
ethylenebis(indenyl)diethyl zirconium,
ethylenebis(indenyl)diphenyl zirconium,
ethylenebis(indenyl)methyl zirconium, ethylenebis(indenyl)ethyl zirconium monochloride,
ethylenebis(indenyl)zirconium dichloride,
isopropylbisindenyl zirconium dichloride,
isopropyl(cyclopentadienyl)-1-fluorenyl zirconium chloride,
ethylenebis(indenyl)zirconium dibromide,
ethylenebis(indenyl)zirconium methoxymonochloride,
ethylenebis(indenyl)zirconium ethoxymonochloride,
ethylenebis(indenyl)zirconium phenoxymonochloride,
ethylenebis(cyclopentadienyl)zirconium dichloride,
propylenebis(cyclopentadienyl)zirconium dichloride,
ethylenebis(t-butylcyclopentadienyl)zirconium dichloride,
ethylenebis(4,5,6,7-tetrahydro-1-indenyl)dimethyl zirconium,
ethylenebis(4,5,6,7-tetrahydro-1-indenyl)methyl zirconium monochloride,
ethylenebis(4,5,6,7-tetrahydro-1-indenyl)zirconium dichloride,
ethylenebis(4,5,6,7-tetrahydro-1-indenyl)zirconium dibromide,
ethylenebis(4-methyl-1-indenyl)zirconium dichloride,
ethylenebis(5-methyl-1-indenyl)zirconium dichloride,
ethylenebis(6-methyl-1-indenyl)zirconium dichloride,
ethylenebis(7-methyl-1-indenyl)zirconium dichloride,
ethylenebis(5-methoxy-1-indenyl)zirconium dichloride,
ethylenebis(2,3-dimethyl-1-indenyl)zirconium dichloride,
ethylenebis(4,7-dimethyl-1-indenyl)zirconium dichloride, and
ethylenebis(4,7-dimethoxy-1-indenyl)zirconium dichloride.

The same transition metal compounds as the above-mentioned zirconium compounds except that the zirconium metal is replaced with a metal of titanium, hafnium, chromium or vanadium are also usable in the catalyst component [i].

The organometallic compound catalyst components [ii] used in combination with the catalyst components [i] are preferably known aluminoxane compounds and aluminumoxy compounds. The aluminumoxy compounds may be formed, for example, by reaction of an organoaluminum compound with water or by reaction of a solution of aluminoxane in a hydrocarbon solvent with an active hydrogen-containing compound. The aluminumoxy compounds are insoluble or sparingly soluble in benzene at 60° C.

In the preparation of the polymer particles used herein, the amount of the catalyst used varies according to the kind of the catalyst used. For example, when a combination of the aforementioned catalyst component [A], organometallic compound catalyst component [B] and electron donor [C], or a combination of the above-mentiondcatalyst component [i] and catalyst component [ii] is are used, the the component [A] or [i] is used in an amount, based on 1 liter of the polymerization volume, of usually from 0.001 to 0.5 mmol, preferably from 0.005 to 0.5 mmol in terms of the transition metal, and the organometallic compound catalyst component [B] or [ii] is used in an amount, based on 1 mole of the transition metal atom of the component [A] or [i] in the polymerization system, of usually from 1 to 10000 moles, preferably from 5 to 500 moles in terms of the metal. Further, the electron donor [C], if any, is used in an amount, based on 1 mole of the transition metal atom of the component [A] in the polymerization system, of not more than 100 moles, preferably from 1 to 50 moles, and more preferably from 3 to 20 moles.

The polymerization or copolymerization may be carried out in the presence of the above-mentioned catalyst, at a temperature of usually from 20° to 200° C., preferably from 50° to 100° C., and under a pressure of from normal pressure to 100 kg/cm$^2$, preferably from 2 to 50 kg/cm$^2$.

In the preparation of the polymer particles used herein, preliminary polymerization is preferably carried out prior to main polymerization. In carrying out the preliminary polymerization, there is used as the catalyst the catalyst component [A] in combination with the organometallic compound catalyst component [B], or a combination of the catalyst components [i] and [ii].

In the preliminary polymerization, the amount of polymerization, when titanium is used as the transition metal, is usually from 1 to 2000 g, preferably from 3 to 1000 g, and more preferably from 10 to 500 g of polymer/g of the titanium catalyst component.

The preliminary polymerization is preferably carried out in the presence of inert hydrocarbon solvents, and examples of the inert hydrocarbon solvents used in this case include aliphatic hydrocarbons such as propane, butane, n-pentane, i-pentane, n-hexane, i-hexane, n-pentane, n-octane, i-octane, n-decane, n-dodecane and kerosine; alicyclic hydrocarbons such as cyclopentane, methylcyclopentane, cyclohexane and methylcyclohexane; aromatic hydrocarbons such as benzene, toluene and xylene; and halogenated hydrocarbons such as methylene chloride, ethyl chloride, ethylene chloride and chlorobenzene. Of the inert hydrocarbon solvents mentioned above, particularly preferred are aliphatic hydrocarbons, especially those having from 4 to 10 carbon atoms. It is also possible to use as the solvents the starting monomers used in the reaction.

Examples of α-olefins suitably used in the preliminary polymerization are those of not more than 10 carbon atoms such as ethylene, propylene, 1-butene, 1-pentene, 4-methyl-1-pentene, 3-methyl-1-pentene, 1-heptene, 1-octene and 1-decene. Of these α-olefins, preferred are those having from 3 to 6 carbon atoms, and especially propylene. These α-olefins may be used singly or in combination of two or more so far as an appropriate proportion of the crystalline polymer may be prepared. For example, in order to prepare polymer particles containing portions of an amorphous olefin polymer in a relatively large proportion, e.g. not less than 30% by weight, and having good morphology, the prepolymerization may be carried out using a mixed gas of from 70 to 98 mol % of propylene and from 30 to 2 mol % of ethylene, thereby effecting copolymerization of propylene with ethylene.

The polymerization temperature employed in the preliminary polymerization varies according to the kind of α-olefin and inert solvent used and so cannot be defined indiscriminately, but generally is from −40° to 80° C., preferably from −20° to 40° C. and more preferably from −10° to 30° C. For example, the polymerization temperature is from −40° to 70° C. when propylene is used as the α-olefin, from −40° to 40° C. when 1-butene is used, and from −40° to 70° C. when 4-methyl-1-pentene and/or 3-methyl-1-pentene is used. In the reaction system of this preliminary polymerization, hydrogen gas may also be allowed to coexist therewith.

After carrying out or not carrying out the above-mentioned preliminary polymerization, the aforesaid monomer is then introduced into the reaction system to carry out polymerization reaction (main polymerization), whereby the polymer particles can be prepared.

The monomer or monomers used in the main polymerization may be the same or different from the monomer or monomers used in the preliminary polymerization.

The polymerization temperature employed in this main polymerization is usually from −50° to 200° C., preferably from 0° to 150° C. The polymerization pressure employed is usually from normal pressure to 100 kg/cm$^2$, preferably from normal pressure to 50 kg/cm$^2$, and the polymerization reaction may be carried out by any of the batchwise, semi-continuous and continuous methods.

The molecular weight of the olefin polymer may be regulated by the addition of hydrogen and/or by adjusting the polymerization temperature.

The polymer particles thus obtained, each is composed of a portion or portions comprising a crystalline olefin polymer and portions comprising an amorphous olefin polymer. In the polymer particles used herein, the proportion of the amorphous olefin polymer present therein is usually from 20 to 80% by weight, preferably from 25 to 70% by weight, more preferably from 30 to 60% by weight, and most preferably from 33 to 55% by weight. The content of the amorphous olefin polymer of the polymer particles can be determined by measuring an amount of a component which is soluble in n-decane at 23° C.

It is desirable to use such polymer particles which have not been heated even once to a temperature higher than both the melting point of the crystalline olefin polymer and the glass transition point of the amorphous olefin polymer. In such polymer particles which have not been heated even once to a temperature higher than both the melting point of the crystalline olefin polymer and the glass transition point of the amorphous olefin polymer, the islands constituted by the amorphous olefin polymer have an average particle diameter of not exceeding 0.5 μm, preferably not exceeding 0.1 μm, and more preferably from 0.00001 to 0.05 μm.

The term "amorphous olefin polymer" as used herein is intended to designate that part of polymer particles which dissolves in n-decane at 23° C., and specifically is obtained by solvent separation in such a manner that a mixture of n-decane (500 ml) and the polymer particles (3 g) is stirred at a temperature of 140°-145° C. to dissolve that part of the polymer particles in the solvent as far as possible; after the stirring is suspended, the resulting suspension is cooled to 80° C. in 3 hours and to 23° C. in 5 hours, and kept at 23° C. for 5 hours and then filtered through a G-4 glass filter; and the n-decane is removed from the resulting filtrate to obtain the amorphous polymer.

In the process according to the invention, the thermoplastic elastomer composition is prepared in such a manner that the above-mentioned polymer particles are incorporated with about from 0.01 to 2 parts by weight, preferably preferably from 0.03 to 1 part by weight, and more preferably from 0.05 to 0.5 part by weight of a crosslinking agent, based on 100 parts by weight of the polymer particles, and the resulting mixture is dynamically heat treated to effect crosslinking partially or fully.

The expression "dynamically heat treating" as used herein is intended to mean that the mixture of the polymer particles and crosslinking agent is kneaded in a molten state. In this case, the kneading apparatus used is an open type apparatus such as a mixing roll, or a closed type apparatus such as a Banbury mixer, extrusion machine, kneader or a continuous type mixer.

The kneading is preferably carried out in the closed type kneading apparatus in an atmosphere of inert gas such as nitrogen or carbon dioxide gas. The kneading temperature employed is usually from 150° to 280° C., preferably from 170° to 240° C., and the kneading time employed is usually from 1 to 20 minutes, preferably from 1 to 10 minutes.

The crosslinking agents which can be used herein are organic peroxides, sulfur, phenol type vulcanizers, oximes and polyamines, and from the standpoint of properties of the resulting thermoplastic elastomers, organic peroxides and phenol type vulcanizers, in particular organic peroxides are preferred.

Usable phenol type vulcanizers include alkylphenolaldehyde resins, triazine-formaldehyde resins and melamine-formaldehyde resins.

Usable organic peroxides include dicumyl peroxide, di-tert-butyl peroxide, 2,5-dimethyl-2,5-bis(tert-butylperoxy)hexane, 2,5-dimethyl-2,5-bis(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, dibenzoyl peroxide and tert-butylperoxybenzoate. Of the organic peroxides mentioned above, preferred are dibenzoyl peroxide and 1,3-bis(tertbutylperoxyisopropyl)benzene from the standpoint of crosslinking reaction time, odor and scorch stability.

In order to realize uniform and mild crosslinking reaction, crosslinking auxiliaries are used preferably. Crosslinking auxiliaries usable herein include, for example, sulfur, p-quinone dioxime, p,p'-dibenzoylquinine dioxime, N-methyl-N-4-dinitroisoaniline, nitrobenzene, diphenyl guanidine, trimethylolpropane-N,N-m-phenylene dimaleimide, divinylbenzene, triallyl cyanurate, ethylene glycol dimethacrylate, diethylene glycol dimethacrylate, polyethylene glycol dimethacrylate, trimethylolpropane trimethacrylate, allyl methacrylate, as vinyl butyrate and vinyl stearate. By the use of such compounds as exemplified above, the uniform and mild crosslinking reaction can be expected. Particularly, the use of divinylbenzene in the process according to the invention is most preferable, because this divinylbenzene is easy to handle and has a good compatibility to the polymer particles and, moreover, has an organic peroxide solubilizing action and acts as a dispersion assistant of peroxide and accordingly provides a uniform and mild crosslinking reaction, whereby a thermoplastic elastomer which is well balanced between flowability and physical properties is obtained. In the present invention, such crosslinking auxiliaries are used in an amount, based on 100 parts by weight of the polymer particles, of from 0.1 to 2% by weight, preferably from 0.3 to 1% by weight, whereby a thermoplastic elastomer excellent in flowability, which does not bring about change in physical properties by a heat history at the time of molding said elastomer, is obtained.

In the process according to the invention, it is also possible to carry out the crosslinking reaction of the polymer particles and the crosslinking agent, and optionally the crosslinking auxiliary by adding thereto a mineral oil softening agent.

The mineral oil softening agent is a high boiling petroleum fraction which is usually used for the purposes of weakening intermolecular force of rubber when the rubber is rolled, and facilitating the processing and, at the same time, assisting dispersion of carbon black, white carbon and the like, or of reducing the vulcanized rubber in hardness to increase flexibility or elasticity, and such mineral oil softening agent includes paraffinic, naphthenic and aromatic mineral oils.

The mineral oil softening agents are used for further improving flow characteristics, i.e. moldability of the thermoplastic elastomer, in an amount, based on 100 parts by weight of the polymer particles, of usually from 1 to 100 parts by weight, preferably from 3 to 90 parts by weight and more preferably from 5 to 80 parts by weight.

Stabilizers including phenolic, phosphorus, sulfur, hyndered amine and higher fatty acid stabilizers may be incorporated into the polymer particles used in or into the thermoplastic elestomers prepared by the process according to the invention. The amount of the stabilizer used may be from 0.01 to 10 parts by weight, preferably from 0,05 to 5 parts by weight, based on 100 parts by weight of the polymer.

The thermoplastic elestomers prepared by the process according to the invention, may be incorporated with fillers such as calcium carbonate, calcium silicate, clay, caoline, talc, silica, diatomaeceous earth, mica powder, asbestos, alumina, barium sulfate, aluminum sulfate, calcium sulfate, basic magnesium carbonate, molibdenum disulfide, graphite, glass giber, glass bead, Shirasu baloon and carbon fiber; and coloring agents such as carbon black, titanium oxide, zinc flower, red iron oxide, ultramarine, prussian blue,azo dyes, nitoso dyes, lake pigments and phthalocyanine pigments.

The thermoplastic elastomers thus obtained desirably contain an insoluble gel content which is not extracted in cyclohexane, as measured by the following procedure, in an amount of at least 10% by weight, preferably from 40 to 100% by weight, more preferably from 60 to 90% by weight and most preferably from 80 to 98% by weight.

When the gel content as measured above is 100% by weight, this shows that the resulting thermoplastic elastomer has been perfectly crosslinked.

The cyclohexane-insoluble gel content is measured in the following manner. About 100 g of pellets (1 mm × 1 mm × 0.5 mm) as specimen of the thermoplastic elastomer was immersed in 30 cc of cyclohexane in a closed container at 23° C. for 48 hours, the specimen was taken out therefrom and then dried. When the thermoplastic elastomer contains cyclohexane-insoluble fillers, pigments or the like, the weight of the dried specimen from which the total weight of such insolubles as mentioned above has been subtracted is taken as a corrected final weight (Y) after drying. On one hand, the weight of the pellets as the specimen from which the total weight of components insoluble in cyclohexane other than the ethylene/α-olefin copolymer, for example, plasticizer and cyclohexane-insoluble rubber component, and from which the total weight of cyclohexane-insoluble fillers, pigments and the like other than the polyolefin resin contained in the thermoplastic elastomer has been subtracted when such insolubles are contained in said thermoplastic elastomer, is taken as a corrected initial weight (X).

From the values of above-mentioned weights, the cyclohexane-insoluble gel content is determined according to the following equation, $$\text{Gel content (\%)} = \frac{\text{Corrected final weight } (Y)}{\text{Corrected initial weight } (X)} \times 100$$

Effect of the Invention

By the process according to the invention, there are obtained at low production costs thermoplastic elastomers which have excellent elasticity even with a reduced rubber content and excellent strength, and are capable of being molded to articles which are very uniform, and excellent in strength properties such as impact strength and tensile strength, toughness, heat resistance, flexibility at low temperature, surface smoothness, and properties of being painted.

In particular, the thermoplastic elastomers in which the amorphous polymer portions (rubber component) are fixed at a molecular segment level in the polymer particles, are capable of being molded to articles which are excellent by far in flexibility at low temperature, surface smoothness and properties of being painted, in particular, in appearance after painted.

The thermoplastic elastomers obtained by the process according to the present invention can be molded by using molding apparatus used for common thermoplastic polymers, and are suitable for extrusion molding, calender molding and particularly for injection molding.

Such thermoplastic elastomers are used for the manufacture of automotive parts such as body panel, bumper part, side shield and steering wheel, footwears such as sole of a shoe and sandals, electrical parts such as covering of electric wire, connector, cap plug and packings, leisure goods such as golf club grip, baseball bat grip, fin for swimming and hydroscope, gasket, waterproof cloth, garden hose and belt.

The invention is illustrated below with reference to examples, but it should be construed that the invention is no way limited to the examples.

EXAMPLES

Preparation of Catalyst Component [A]

A thoroughly nitrogen-purged high speed stirring apparatus having an internal volume of 2 liters (manufactured and sold by Tokushukika Kogyo K.K.) was charged with 700 ml of purified kerosine, 10 g of commercially available MgCl$_2$, 24.2 g of ethanol and 3 g of sorbitan distearate (sold under a trade name Emasole 320 by Kao Atlas K.K.), and the system was elevated in temperature with stirring and stirred at 120° C. for 30 minutes at 800 rpm. Using a Teflon tube having an inside diameter of 5 mm, the contents of the stirring apparatus was transferred with high speed stirring to a 2-liter glass flask (equipped with a stirrer) having been charged with 1 liter of purified kerosine previously cooled to −10° C. The resulting solids were collected by filtration and thoroughly rinsed with hexane to obtain carriers.

To a suspension of 7.5 g of the carrier in 150 ml of titanium tetrachloride at room temperature was added 1.3 ml of diisobutyl phthalate, and the system was then elevated in temperature to 120° C. After 2-hour stirring at 120° C., the solids were collected by filtration and suspended again in 150 ml of titanium tetrachloride, followed by stirring again at 130° C. for 2 hours. The reacted solids were collected by filtration from the reaction product and thoroughly rinsed with a sufficient amount of purified hexane to obtain a solid catalyst component [A]. This catalyst component was composed of 2.2% by weight of titanium, 63% by weight of chlorine and 20% by weight of magnesium, in terms of atom, and 5.5% by weight of diisobutyl phthalate. Thus, there was obtained a spherical catalyst having an average particle size of 64 μm and a geometrical standard deviation ($\delta_g$) of 1.5 of particle size distribution.

Preliminary Polymerization

The catalyst component [A] was subjected to the following preliminary polymerization.

A 400 ml nitrogen-purged glass reactor charged previously with 200 ml of purified hexane was then charged with 20 mmoles of triethylaluminu, 4 mmoles of diphenyl dimethoxysilane and 2 mmoles, in terms of titanium atom, of the above-mentioned Ti catalyst component [A], and propylene was fed at a rate of 5.9 Nl/hr over a period of 1 hour to polymerize 2.8 g of propylene per 1 g of the Ti catalyst component [A]. After the completion of the preliminary polymerization, the liquid portion was removed, and the solids portion separated was suspended again in decane.

Polymerization

Preparation of Copolymer (1)

A 20-liter polymerization vessel charged with 2.0 kg of propylene and 19 Nl of hydrogen at room temperature was elevated in temperature, and then charged at 50° C. with 15 mmoles of triethylaluminum, 1.5 mmoles of dicyclohexyl dimethoxysilane and 0.05 mmole, in terms of titanium atom, of the catalyst component [A] which had been subjected to the preliminary polymerization, and the temperature inside the polymerization vessel was maintained at 70° C. In the lapse of 10 minutes thereafter, a vent valve was opened to purge the propylene until normal pressure inside the polymerization vessel was attained. After the purge, copolymerization was successively carried out. That is, to the polymerization vessel were fed ethylene at a rate of 480 Nl/hr, propylene at a rate of 720 Nl/hr and hydrogen at a rate of 12 Nl/hr. The divergence of the vent of the polymerization vessel was controlled so that the pressure inside the vessel became 10 kg/cm². The temperature in the polymerization vessel was maintained at 70° C. The copolymerization was carried for 150 minutes.

Properties of the copolymer (1) so obtained are shown in Table 1.

Preparation of Copolymers (2) and (3)

The catalyst component [A] was subjected to the following preliminary polymerization.

A 1000 ml nitrogen-purged glass reactor charged previously with 400 ml of purified hexane was then charged with 1.32 mmoles of triethylaluminu, 0.27 mmoles of cyclohexylmethyldimethoxysilane and 0.132 mmoles, in terms of titanium atom, of the above-mentioned Ti catalyst component [A]. Propylene and ethylene were mixed and fed to the liquid phase in the reactor at rates of 8.4 Nl/hr and 1.0 Nl/hr, respectively, over a period of 100 minutes, during which the temperature was kept at 20°±2° C. After the completion of the preliminary polymerization, the liquid portion was removed by filtration, and the solid portion separated was suspended again in decane. It was revealed by analysis that the solid catalyst so subjected to the preliminary polymerization contained about 92 g of polymer per 1 g of the Ti catalyst component [A] used, and the filtrate contained 6.2 g of a soluble polymer dissolved therein, per 1 g of the Ti catalyst component [A] used.

The polymerization procedures described above were repeated except that the Ti catalyst component [A], which had been subjected to the preliminary polymerization described in the preceding paragraph, was used and that the polymerization was carried out under conditions indicated in Table 1.

Properties of the copolymers (2) and (3) so obtained are shown in Table 1.

TABLE 1

| Copolymers (1) to (3) | (1) | (2) | (3) |
|---|---|---|---|
| Homopolymerization of propylene | | | |
| Propylene (kg) | 2.0 | 2.0 | 1.7 |
| Hydrogen (Nl) | 19 | 9 | 5 |
| Polymerization Time (min.) | 30 | 20 | 10 |
| Copolymerzation of propylene and ethylene | | | |
| Ethylene (Nl/hr.) | 480 | 480 | 480 |
| Propylene (Nl/hr.) | 720 | 720 | 720 |
| Hydrogen (Nl/hr.) | 12 | 12 | 18 |
| Polymerization Temp. (°C.) | 70 | 70 | 70 |
| Polimerization Time (min.) | 150 | 90 | 200 |
| Properties of Copolymer | | | |
| MFR | 3.7 | 3.9 | 3.0 |
| Content of ethylene (mol %) | 27 | 30 | 35 |
| Content of n-decane solubles (wt %) | 29 | 36 | 47 |

EXAMPLE 1

Particles(100 parts by weight) of the copolymer (1) was blended with a solution of 0.2 part by weight of 1,3-bis(tert-butylperoxyisopropyl)benzene dissolved in 0.3 part by weight of divinylbenzene and 5 parts by weight of parrafinic process oil in a tumbler blender to cause the solution to uniformly adhere to surfaces of the particles. The particles were then extruded by means of an extruder under a nitrogen atmosphere and at a temperature of 210° C. to provide pellets.

The particles of the copolymer (1) used had an average particle diameter of 2200 μm with a geometric standard deviation of 1.5 and an aparent bulk density of 0.45 g/ml, contained fine particles passing through 150 mesh in an amount of 0.1% by weight and exhibited a falling time of 8.3 seconds.

The pellets were injection molded to a square plate having a thickness of 3 mm under the conditions noted below.

Conditions of Injection Molding

Molding machine: Dinamelter (supplied by MEIKI Works K. K.)
Molding temperature: 200° C.
Injection pressure: Primary pressure 1300 kg/cm², Secondary pressure 700 kg/cm²
Injection speed: Maximum
Molding rate: 90 seconds/cycle
Gate: Direct gate (with a gate land of 10 mm in length, 10 mm in width and 3 mm in depth)

Moldability

On the injection molded plate moldability of the copolymer was evaluated.

| Rating | Key for the evaluation of moldability |
|---|---|
| | Key |
| 1 | A great number of flow marks on the surfaces of the plate |
| 2 | A considerable number of flow marks on the whole surfaces of the plate |

-continued

| Rating | Key for the evaluation of moldability<br>Key |
|---|---|
| 3 | A few flow marks on the whole surfaces of the plate |
| 4 | A few flow marks only on the surface of the plate opposite to the gate |
| 5 | No flow marks |

Physical Properties

Specimens were cut out from the injection molded plate and tested for tensile properties, initial flexual modulus and Izod impact strength.

Tensile properties, including 100% tensile stress ($M_{100}$, in kg/cm$^2$), tensile strength at break ($T_b$ in kg/cm$^2$) and elongation at break ($E_b$ in %) were determined in accordance with JIS K-6031. Initial flexual modulus (FM in kg/m$^2$) was determined in accordance with ASTM D 790. Notched Izjod impact strength (Izod in kgcm/cm) was determined in accordance with ASTM D 256.

Appearance After Painted

The injection molded plate was finished with a paint in the manner as noted below. The plate was subjected to vapor degreasing for 20 seconds with 1,1,1-trichloroethane. A primer "Unistole P-401", supplied by Mitsui Petrochemical Industries Ltd., was applied to a degreased surface of the plate and dried at room temperature. The primer coated surface of plate was painted with a paint R-271, supllied by Nippon B Chemical K. K., and baked at a temperature of 100° C. for 30 minutes.

The plate so finished was tested for appearance (PGD, portable gloss distinctness of image) in accordance with a method described in Journal of the Society of Automotive Engineers of Japan, Vol. 40, page 826 (1986), using an image distinctness gloss meter.

Results are shown in Table 2.

EXAMPLE 2

Example 1 was repeated except that the parrafinic process oil was used in an amount of 10 parts by weight instead of the 5 parts by weight. Results are shown in Table 2.

EXAMPLE 3

Particles(100 parts by weight) of the copolymer (2) was blended with a solution of 0.2 part by weight of 1,3-bis(tert.-butylperoxyisopropyl)benzene dissolved in 0.3 part by weight of divinylbenzene in a tumbler blender to cause the solution to uniformly adhere to surfaces of the particles. The particles were then extruded by means of an extruder under a nitrogen atmosphere and at a temperature of 210° C. to provide pellets.

The particles of the copolymer (2) used had an average particle diameter of 2100 μm with a geometric standard deviation of 1.5 and an aparent bulk density of 0.43 g/ml, contained fine particles passing through 150 mesh in an amount of 0.1% by weight and exhibited a falling time of 9.3 seconds.

The pellets were tested as in Example 1. Results are shown in Table 2.

EXAMPLE 4

Example 3 was repeated except that particles of the copolymer (3) were used instead of the particles of the copolymer (2).

The particles of the copolymer (3) used had an average particle diameter of 2000 μm with a geometric standard deviation of 1.6 and an aparent bulk density of 0.40 g/ml, contained fine particles passing through 150 mesh in an amount of 0.2% by weight and exhibited a falling time of 10.3 seconds.

Results are shown in Table 2.

EXAMPLE 5

Example 3 was repeated except that the particles of the copolymer (1) were used instead of the particles of the copolymer (2). Results are shown in Table 2.

TABLE 2

| Properties of thermo-elastomer | Ex. 1 | Ex. 2 | Ex. 3 | Ex. 4 | Ex. 5 |
|---|---|---|---|---|---|
| MFR | 17 | 20 | 10 | 4.4 | 12 |
| Gel content (wt %) | 84 | 82 | 80 | 85 | 83 |
| $M_{100}$ | 134 | 118 | 135 | 103 | 151 |
| $T_b$ | 220 | 190 | 231 | 173 | 225 |
| $E_b$ | 670 | 660 | 640 | 610 | 640 |
| HS (Shore 'D') | 46 | 42 | 49 | 38 | 53 |
| FM | 4200 | 3300 | 4800 | 2400 | 6200 |
| Izod (−30° C.) | N. B. | N. B. | N. B. | N. B. | 10.7 |
| Moldability | 5 | 5 | 5 | 5 | 5 |
| Appearance | 0.9 | 0.9 | 0.9 | 0.9 | 0.9 |

EXAMPLE 6

Preparation of Catalyst Component [A]

A thoroughly nitrogen-purged high speed stirring apparatus having an internal volume of 2 liters (manufactured and sold by Tokushukika Kogyo K.K.) was charged with 700 ml of purified kerosine, 10 g of commercially available MgCl$_2$, 24.2 g of ethanol and 3 g of sorbitan distearate (sold under a trade name Emasole 320 by Kao Atlas K.K.), and the system was elevated in temperature with stirring and stirred at 120° C. for 30 minutes at 800 rpm. Using a Teflon tube having an inside diameter of 5 mm, the contents of the stirring apparatus was transferred with high speed stirring to a 2-liter glass flask (equipped with a stirrer) having been charged with 1 liter of purified kerosine previously cooled to −10° C. The resulting solids were collected by filtration and thoroughly rinsed with hexane to obtain carriers.

To a suspension of 7.5 g of the carrier in 150 ml of titanium tetrachloride at room temperature was added 1.3 ml of diisobutyl phthalate, and the system was then elevated in temperature to 120° C. After a 2-hour stirring at 120° C., the solids were collected by filtration and suspended again in 150 ml of titanium tetrachloride, followed by stirring again at 130° C. for 2 hours. The reaction solids were collected by filtration from the reaction product and thoroughly rinsed with a sufficient amount of purified hexane to obtain a solid catalyst component [A]. This catalyst component was composed, in terms of atom, 2.2% by weight of titanium, 63% by weight of chlorine, 20% by weight of magnesium, and 5.5% by weight of dissobutyl phthalate. Thus, there was obtained a spherical catalyst having an average particle size of 64 μm and a geometrical standard deviation ($δ_g$) of 1.5 of particle size distribution.

Preliminary Polymerization

The catalyst component [A] was subjected to the following preliminary polymerization.

A 400 ml nitrogen-purged glass reactor charged previously with 200 ml of purified hexane was then charged with 20 mmoles of triethylaluminum, 4 mmoles of diphenyldimethoxysilane and 2 mmoles, in terms of titanium atom, of the above-mentioned Ti catalyst component [A], and propylene was fed at a rate of 5.9 Nl/hr over a period of 1 hour to polymerize 2.8 g of propylene per 1 g of the Ti catalyst component [A]. After the completion of the preliminary polymerization, the liquid portion was removed, and the solids portion separated was suspended again in decane.

Polymerization

Preparation of Copolymer (4)

A 17-liter polymerization vessel charged with 2.5 kg of propylene and 9N liter of hydrogen at room temperature was elevated in temperature, and then charged at 50° C. with 15 mmoles of triethylaluminum, 1.5 mmoles of diphenyldimethoxysilane and 0.05 mmole, in terms of titanium atom, of the catalyst component [A] which had been subjected to the preliminary polymerization, and the temperature inside the polymerization vessel was maintained at 70° C. In the lapse of 10 minutes thereafter, a vent valve was opened to purge the propylene until normal pressure inside the polymerization vessel was attained. After the purge, copolymerization was successively carried out. That is to the polymerization vessel were fed ethylene at a rate of 480 Nl/hr, propylene at a rate of 720 Nl/hr and hydrogen at a rate of 12 Nl/hr. The divergence of the vent of the polymerization vessel was controlled so that the pressure inside the vessel became 10 kg/cm². The temperature of the polymerization vessel was maintained at 70° C. The copolymerization was carried for 85 minutes, and the pressure inside the polymerizer was released to obtain 3.1 kg of a polymer having MI of 3.9 g/10 min at 230° C. under a load of 2 kg, the ethylene content of 28 mol % and an apparent bulk gravity of 0.39. The amount of the component soluble in n-decane at 23° C. was 37% by weight, and the ethylene content in said soluble component was 49 mol %.

A 15-liter stainless steel autoclave equipped with an agitating element having helical type double ribbons is charged with 3 kg of particles the copolymer (4) and completely purged with nitrogen. Thereafter, a mixed liquid having a composition as shown in Table 3 is added dropwise at room temperature over a period of 10 minutes to the autoclave, while stirring the polymer particles, and the stirring is conducted for additional 30 minutes to impregnate the polymer particles with the reagents contained in the mixed liquid. Subsequently, the polymer particles are fed to a twin-screw extruder (PCM-30) to carry out dynamic crosslinking at an extrusion temperature of 230° C.

The thermoplastic elastomer obtained is measured for MFR and gel content. This thermoplastic elastomer is injection molded into a sheet, and the sheet is evaluated for appearance and physical properties. Results are shown in Table 3.

TABLE 3

| Polymer particles | 3 kg of copolymer (4) |
| --- | --- |
| Mixed liquid | |
| Benzoyl peroxide | 6 g |
| Divinylbenzene | 9 g |
| toluene | — |
| paraffinic oil | — |
| Properties | |
| MIR 230° C., 2.16 kg | 15 g/10 min. |
| Gel content | 80 wt % |
| Tensile strength | 190 kg/cm² |
| Elongation | 670% |
| Smoothness of sheet | good |

We claim:

1. A process for preparing partially or fully crosslinked thermoplastic elastomers, which comprises dynamically heat treating polymer particles together with a crosslinking agent, each of said polymer particles is composed of from 80 to 20 parts by weight of a crystalline portion comprising a crystalline propylene polymer and from 20 to 80 parts by weight of an amorphous portion comprising an amorphous ethylene-α-olefin copolymer, wherein said polymer particles composed of a crystalline portion and an amorphous portion have a sea-and-islands structure in which said islands comprise said amorphous portion and said islands have an average particle diameter not exceeding 0.5 μm, said polymer particles having an average particle diameter of from 10 to 5000 μm and an apparent bulk density of at least 0.2 g/ml, each of said polymer particles is obtained from a polymerization process comprising at least two steps in series to form said amorphous and crystalline portions in the polymer particles.

2. The process for preparing thermoplastic elastomers in accordance with claim 1 wherein said polymer particles have an average particle diameter of from 10 to 5000 μm with a geometric standard deviation of from 1.0 to 3.0.

3. The process for preparing thermoplastic elastomers in accordance with claim 1 wherein said polymer particles have an aparent bulk density of from 0.2 to 0.7 g/ml.

4. The process for preparing thermoplastic elastomers in accordance with claim 3 wherein said polymer particles have an aparent bulk density of from 0.3 to 0.7 g/ml.

5. The process for preparing thermoplastic elastomers in accordance with claim 1 wherein said crosslinking agent is used in an amount of from 0.01 to 2 parts by weight based on 100 parts by weight of said polymer particles.

6. The process for preparing thermoplastic elastomers in accordance with claim 1 wherein the dynamic heat treatment is carried out in an extruder.

7. A process for preparing partially or fully crosslinked thermoplastic elastomers, which comprises dynamically heat treating polymer particles together with a crosslinking agent and a crosslinking auxiliary, each of said polymer particles is composed of from 80 to 20 parts by weight of a crystalline portion comprising a crystalline propylene polymer and from 20 to 80 parts by weight of an amorphous portion comprising an amorphous ethylene-α-olefin copolymer, wherein said polymer particles composed of a crystalline portion and an amorphous portion have a sea-and-islands structure in which said islands comprise said amorphous portion and said islands have an average particle diameter not exceeding 0.5 μm, said polymer particles having an average particle diameter of from 10 to 5000 μm and an apparent bulk density of at least 0.2 g/ml, each of said polymer particles is obtained from a polymerization process comprising at least two steps in series to form said amorphous and crystalline portions in the polymer particles.

8. The process for preparing thermoplastic elastomers in accordance with claim 7 wherein the crosslinking auxiliary is divinylbenzene.

9. The process for preparing thermoplastic elastomers in accordance with claim 7 wherein the crosslinking auxiliary is used in an amount of from 0.1 to 2 parts by weight.

10. The process for preparing thermoplastic elastomers in accordance with claim 7 wherein the dynamic heat treatment is carried out in an extruder.

11. A process for preparing partially or fully crosslinked thermoplastic elastomers, which comprises dynamically heat treating polymer particles together with a crosslinking agent and a mineral oil softening agent, each of said polymer particles is composed of from 80 to 20 parts by weight of a crystalline portion comprising a crystalline propylene polymer and from 20 to 80 parts by weight of an amorphous portion comprising an amorphous ethylene-α-olefin copolymer, wherein said polymer particles composed of a crystalline portion and an amorphous portion have a sea-and-islands structure in which said islands comprise said amorphous portion and said islands have an average particle diameter not exceeding 0.5 μm, said polymer particles having an average particle diameter of from 10 to 5000 μm and an apparent bulk density of at least 0.2 g/ml, each of said polymer particles is obtained from a polymerization process comprising at least two steps in series to form said amorphous and crystalline portions in the polymer particles.

12. A process for preparing partially or fully crosslinked thermoplastic elastomers, which comprises dynamically heat treating polymer particles together with a crosslinking agent, a crosslinking auxiliary and a mineral oil softening agent, each of said polymer particles is composed of from 80 to 20 parts by weight of a crystalline portion comprising a crystalline propylene olefin polymer and from 20 to 80 parts by weight of an amorphous portion comprising an amorphous ethylene-α-olefin copolymer, wherein said polymer particles composed of a crystalline portion and an amorphous portion have a sea-and-islands structure in which said islands comprise said amorphous portion and said islands have an average particle diameter not exceeding 0.5 μm, said polymer particles having an average particle diameter of from 10 to 5000 μm and an apparent bulk density of at least 0.2 g/ml, each of said polymer particles is obtained from a polymerization process comprising at least two steps in series to form amorphous and crystalline portions in the polymer particles.

13. The process according to claim 11 or 12 wherein said mineral oil softening agent is used in an amount of from 1 to 100 parts by weight based on 100 parts by weight of said polymer particles.

* * * * *